(12) United States Patent
Deora et al.

(10) Patent No.: US 10,002,607 B2
(45) Date of Patent: Jun. 19, 2018

(54) CROSS DEVICE COMPANION APPLICATION FOR PHONE

(71) Applicant: Microsoft Technology Licensing, LLC, Redmond, WA (US)

(72) Inventors: Gautam Deora, Hyderabad (IN); Vikas Verma, Hyderabad (IN); Saumya Chandra, Hyderabad (IN); Manoj Lalavat, Hyderabad (IN); Sonia Singh, Hyderabad (IN); Badhri Ravikumar, Hyderabad (IN); Anushree Bansal, Hyderabad (IN); Snehita Peddi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/988,350

(22) Filed: Jan. 5, 2016

(65) Prior Publication Data
US 2017/0195495 A1  Jul. 6, 2017

(51) Int. Cl.
*G10L 15/065* (2013.01)
*H04M 3/42* (2006.01)
(Continued)

(52) U.S. Cl.
CPC ............ *G10L 15/065* (2013.01); *G06F 3/002* (2013.01); *G06F 3/04842* (2013.01);
(Continued)

(58) Field of Classification Search
CPC ....... H04M 2201/40; H04M 2203/251; H04M 2203/352; H04M 2203/353;
(Continued)

(56) References Cited

U.S. PATENT DOCUMENTS 6,078,914 A    6/2000  Redfern
7,302,280 B2  11/2007  Hinckley et al.
(Continued)

OTHER PUBLICATIONS

Napierski, Jason. "Speech Analytics: the Key to Extracting Valuable Data from Calls", Published on May 2, 2014 Available at: http://callminer.com/speech-analytics-key-extracting-valuable-data-calls/.

(Continued)

*Primary Examiner* — Binh Tieu
(74) *Attorney, Agent, or Firm* — International IP Law Group, PLLC

(57) ABSTRACT

Example apparatus and methods concern establishing context for a phone call. A computing device is controlled to display content and applications that are relevant for the call during the call. A party on the call is identified using data received from a phone used by the party. The relevant content and the relevant application are identified using actions (e.g., purchase to make, call to make) and intentions (e.g., family matter, business matter) identified in text provided in a text-based transcript of the call. The text-based transcript is provided in real time by a natural language processing (NLP) service during the call. The devices are controlled to selectively present the relevant content and the relevant application to make the call more automated and more productive. A to-do list is automatically generated based on the intentions, the actions, and on subject matter or content discussed or accessed during the call.

20 Claims, 8 Drawing Sheets

(51) Int. Cl.
| | |
|---|---|
| *H04L 29/08* | (2006.01) |
| *G06F 3/00* | (2006.01) |
| *G10L 15/00* | (2013.01) |
| *G10L 15/22* | (2006.01) |
| *G10L 15/26* | (2006.01) |
| *H04M 1/57* | (2006.01) |
| *H04M 1/725* | (2006.01) |
| *H04W 8/26* | (2009.01) |
| *G06F 3/0484* | (2013.01) |
| *G06Q 10/10* | (2012.01) |
| *H04M 1/2745* | (2006.01) |
| *H04M 1/56* | (2006.01) |
| *H04M 7/00* | (2006.01) |
| *G06N 99/00* | (2010.01) |
| *H04M 3/436* | (2006.01) |
| *H04W 88/02* | (2009.01) |

(52) U.S. Cl.
CPC .......... *G06Q 10/109* (2013.01); *G10L 15/00* (2013.01); *G10L 15/22* (2013.01); *G10L 15/26* (2013.01); *H04L 67/306* (2013.01); *H04M 1/274516* (2013.01); *H04M 1/56* (2013.01); *H04M 1/575* (2013.01); *H04M 1/72522* (2013.01); *H04M 1/72583* (2013.01); *H04M 1/72597* (2013.01); *H04M 3/42042* (2013.01); *H04M 7/0024* (2013.01); *H04W 8/26* (2013.01); *G06N 99/005* (2013.01); *H04M 3/42221* (2013.01); *H04M 3/4365* (2013.01); *H04M 7/0036* (2013.01); *H04M 2201/40* (2013.01); *H04M 2203/2011* (2013.01); *H04M 2203/2038* (2013.01); *H04M 2250/60* (2013.01); *H04M 2250/68* (2013.01); *H04W 76/10* (2018.02); *H04W 88/02* (2013.01)

(58) Field of Classification Search
CPC ...... H04M 3/2209; H04M 1/64; H04M 3/493; H04L 51/04; H04L 51/32; G06Q 10/10
USPC ......... 379/88.19, 88.2, 93.17, 93.23, 142.01, 379/142.06, 142.09, 142.14, 142.17, 245, 379/247, 142.04
See application file for complete search history.

(56) References Cited

U.S. PATENT DOCUMENTS

| | | | |
|---|---|---|---|
| 7,324,947 | B2 | 1/2008 | Jordan et al. |
| 7,640,160 | B2 | 12/2009 | Di Cristo et al. |
| 7,818,176 | B2 | 10/2010 | Freeman et al. |
| 8,117,268 | B2 | 2/2012 | Jablokov et al. |
| 8,275,618 | B2 | 9/2012 | Ganong |
| 8,296,383 | B2 | 10/2012 | Lindahl |
| 8,660,847 | B2 | 2/2014 | Soemo et al. |
| 8,731,942 | B2 | 5/2014 | Cheyer et al. |
| 8,792,627 | B2 * | 7/2014 | Begeja ............ H04M 3/4872 379/114.13 |
| 9,117,447 | B2 | 8/2015 | Gruber et al. |
| 9,172,795 | B1 | 10/2015 | Rathod |
| 2003/0063732 | A1 | 4/2003 | McKnight |
| 2008/0091426 | A1 | 4/2008 | Rempel et al. |
| 2008/0107100 | A1 * | 5/2008 | Begeja ............ H04M 3/4872 370/352 |
| 2009/0313553 | A1 * | 12/2009 | Thornton ........ H04L 29/06027 715/751 |
| 2011/0231773 | A1 | 9/2011 | Dhara et al. |
| 2012/0021730 | A1 * | 1/2012 | Vendrow ............ H04M 3/02 455/415 |
| 2013/0007150 | A1 * | 1/2013 | Hertz ................ H04L 51/32 709/206 |
| 2013/0332536 | A1 | 12/2013 | Kho et al. |
| 2014/0241514 | A1 * | 8/2014 | Madhavapeddi ..... H04M 3/493 379/88.04 |
| 2014/0337249 | A1 * | 11/2014 | Bank ................ G06Q 30/0282 705/347 |
| 2014/0337751 | A1 | 11/2014 | Lim et al. |
| 2015/0128058 | A1 | 5/2015 | Anajwala |
| 2015/0254675 | A1 * | 9/2015 | Kannan ............ G06Q 30/016 705/304 |
| 2016/0134579 | A1 * | 5/2016 | Buddenbaum ...... H04L 51/32 709/206 |

OTHER PUBLICATIONS

Woollaston, Victoria, "The app that lets deaf people 'hear' phone calls Pedius converts speech to text in real time", Published on: Feb. 23, 2015 Available at http://www.dailymail.co.uk/sciencetech/article-2965063/The-app-lets-deaf-people-hear-phone-calls-Pedius-converts-speech-text-real-time.html.
International Search Report and the Written Opinion of the International Searching Authority, issued in PCT Application No. PCT/US2016/069055, dated Apr. 7, 2017, 19 pages.

* cited by examiner

CROSS DEVICE COMPANION APPLICATION FOR PHONE

BACKGROUND

Before caller-id, someone receiving a phone call had no idea who was calling. After caller-id, the recipient might have known who was calling, but wouldn't have known why. Even if the recipient knew who was calling and why, the recipient still might have had to take several actions to find documents and applications that were relevant to the phone call. Thus, phone calls were often seen as intrusions and may have been ignored rather than answered because the recipient had neither the time nor inclination to experience a context shift.

Conventionally, information stored on the receiving phone or elsewhere (e.g., telecommunications server, cloud, application) may have facilitated partially setting the context for a phone call. For example, when a call was received for which a calling number was available, the familiar caller-id feature may have been employed. In another example, when a call was received from a number for which identifying information had been stored, then that identifying information (e.g., name, photo, business) may have been displayed. The identifying information may have helped the user decide whether to answer the phone. Additionally, the identifying information may have helped the user switch between mental tasks. For example a user may have switched from thinking about a business matter to thinking about a family matter. The identifying information may also have helped the parties to the call save time since they may not have needed to identify each other. For example, if the person receiving the call already knew that the call was from their daughter, then the person receiving the call could have answered "hello Emma" instead of simply saying "hello." Answering by name may have saved time because it established in the caller's mind that the person receiving the call already knew their identity.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods facilitate establishing context for an incoming phone call. The context goes beyond conventional systems like caller id that rely only on information stored on the receiving device or elsewhere (e.g., telecommunications server) that can be retrieved based on a telephone number or other identifier associated with an incoming call. Example apparatus and methods facilitate providing additional context by identifying not just a party, but an intention (e.g., family matter, business matter) for a call and an action (e.g., make appointment, make purchase) to be taken in response to the call. The intention and action may be parsed out of a speech-to-text transcript of the phone call provided during the phone call. Once the intention and actions are identified, applications and content that are relevant to the phone call may be identified and automatically surfaced on devices available to the recipient or caller. Thus, rather than having to manually search for content and applications to display or edit the content, while talking on the phone, the content and applications may be automatically presented. Additionally, a to-do list of actions to be taken following the phone call may be automatically generated.

Example apparatus and methods use information about a party to a call to gather contextual information and to present that contextual information on, for example, a desktop or other related devices during and after a phone call. A computing device(s) may be controlled to display relevant content and a relevant application for a phone call during the phone call. A logic (e.g., circuit, hardware, firmware) may identify a party on the phone call based, at least in part, on data received from a phone used by the party. Information about the caller may be acquired and displayed. For example, documents recently accessed by the caller, social media posts accessed by the caller, searches performed by the caller, or other information may be accessed and selectively displayed. Another logic may identify the relevant content and the relevant application based, at least in part, on text provided in a text-based transcript of the phone call. The text-based transcript may be provided in real time by a natural language processing (NLP) service during the phone call. The content and relevant application may also be identified by the documents/posts/searches/etc. identified for the caller. Another logic may control the device(s) to selectively present the relevant content and the relevant application. Content or applications that are accessed during the phone call may be tracked. A to-do list may be presented after the call. The to-do list may remind a party to the call of an action to be taken after the call. For example, a party may be reminded to make another call, to send an email, to make or keep an appointment, or other action.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
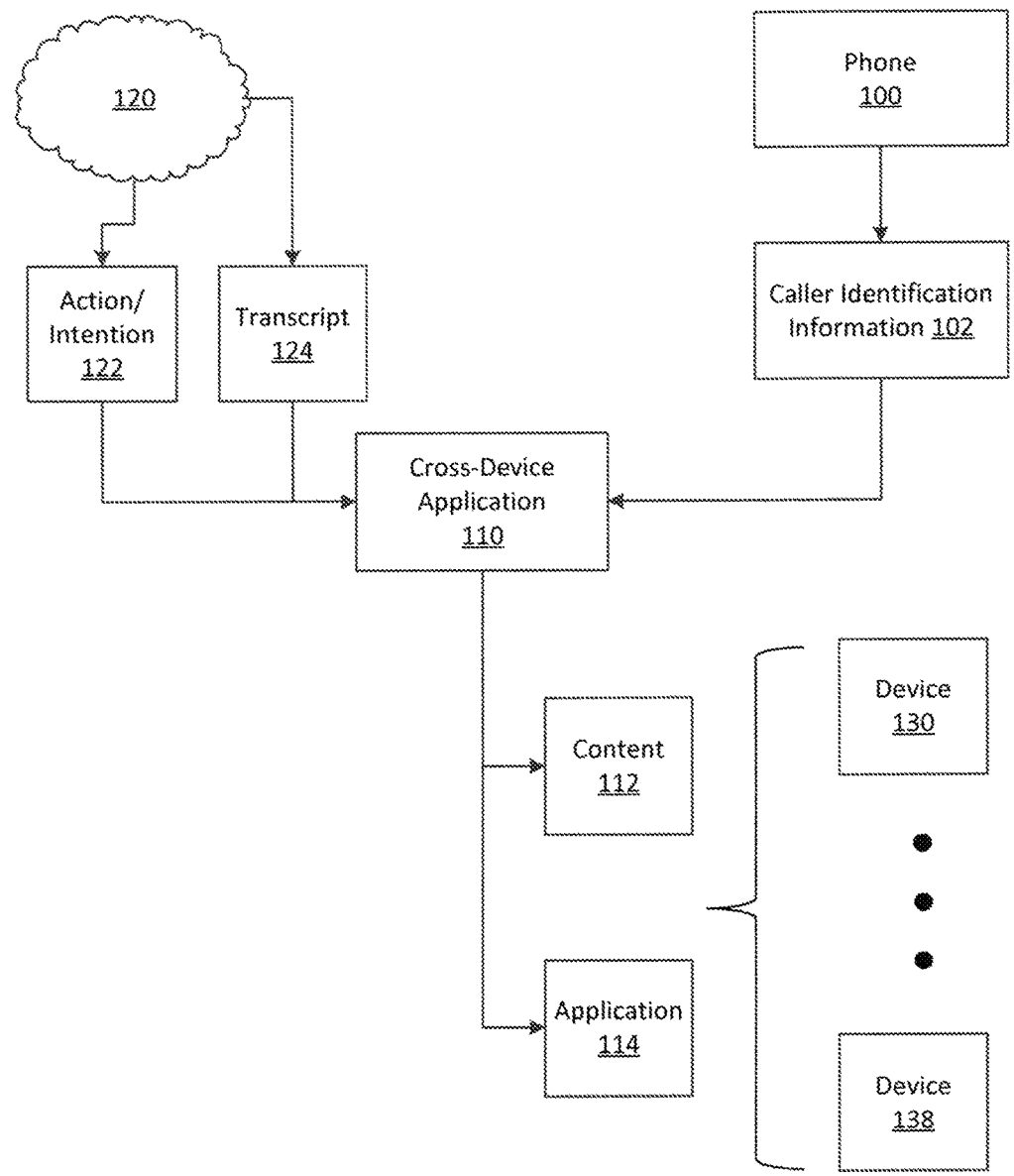
FIG. 1 illustrates an example environment associated with a phone call.

A busy person who receives a phone call may end up asking themselves "who am I talking to?" "why am I talking to them?" "what do I need to look up or what do I need in front of me on the computer to answer this call?" "what do I need to do in response to this call?" and other questions. Conventionally, the busy person might need to stop what they're doing, search through their computer(s) to find documents, content, applications, or other items to answer the call. Conventionally, the busy person might need to remember what to do after the call is over and write down a note. If the call is a lengthy call, the to-do list may only include items that the busy person actually remembers, leaving some items off the list. Example apparatus and methods facilitate establishing context for a phone call, which answers the questions of "who am I talking to" and "why am I talking to them?" Example apparatus and methods also facilitate identifying intentions and actions for a phone call, which in turn facilitates answering the question "what do I need to look up to answer this call?" Example apparatus and methods may also track an entire call so that a to-do list includes all the relevant action items, not just the few that the busy person might remember and write down.

Consider a busy computer programmer standing at their desk working on a complicated device driver. The programmer's cell phone may ring and caller-id may reveal that it is the programmer's wife calling. The programmer knows that he has to answer the call because his wife is a doctor who is even more busy than the programmer and earlier that day she'd sent him an email that informed him that she was going to call him with some instructions for picking up the children. Conventionally, the programmer might have to minimize his code windows and manually bring up some other applications (e.g., email, calendar, map search) so that he could remind himself of why his wife was calling, so he could figure out what time he was going to be free later in the afternoon, and so he would be able to store the address his wife was going to give him. This was if he even remembered why she was going to call in the first place.

Example applications and methods may identify that it is the programmer's wife that is calling, may automatically display her earlier email, and may determine that the call is a family matter and that she is likely calling about picking up the kids later in the day. Thus the calendar application and a map search program may also automatically be surfaced on device(s) (e.g., desktop computer, laptop computer, tablet computer) that are available to the programmer. In one embodiment, the applications or content may be displayed on a device based on the workload being experienced by the device (e.g., very active, inactive), the proximity of the device to the programmer (e.g., in his hand, within his grasp), or based on other factors.

During the call, the programmer's wife may give him the address at which the kids are to be collected and the time. The calendar application may automatically determine that the programmer has no conflicts and the map search program may automatically print out relevant maps. During the call, the programmer's wife may also ask him to pick up some food for dinner. Example apparatus and methods may therefore also bring up locations where the food can be purchased that are on or near the route for picking up the kids. When the call concludes, a to-do list may be presented on the programmer's phone, desktop, laptop, or other computing device(s). When the programmer gets in his car after work, the to-do list may automatically be presented on his car's computing system. Thus, not only will the programmer have a more pleasant, less intrusive phone call that doesn't require him to look up a bunch of information, but the programmer may actually remember what his wife told him and thus actually pick up the food, and the kids, at the appointed time, at the correct location. All of this may be achieved with a more seamless context shift at work and thus with a less painful context shift back to work.

FIG. 1 illustrates an example environment associated with a phone call. A phone 100 provides caller identification information 102 to an example cross-device application 110. Device 110 may be various types of devices including, but not limited to, a phone, a tablet computer, a laptop computer, a smart watch, or a desktop computer. A service 120, which may be located in the cloud, provides action/intention data 122 and a voice-to-text transcript 124 to the cross-device application 110. The cross-device application 110 identifies and surfaces content 112 and application 114, which may be displayed on devices 130 through 138. A member of the devices 130 through 138 may be selected for presenting the content 112 or application 114 based on the type of content, the type of application, a load on a device, a proximity of the device to a viewer, or on other criteria. In one embodiment, rather than receiving action/intention data 122 and voice-to-text transcript 124 from service 120, the action/intention data 122 or voice-to-text transcript 124 may be provided to devices 130-128 which may then produce content 112 or identify application 114.

Figure 2:
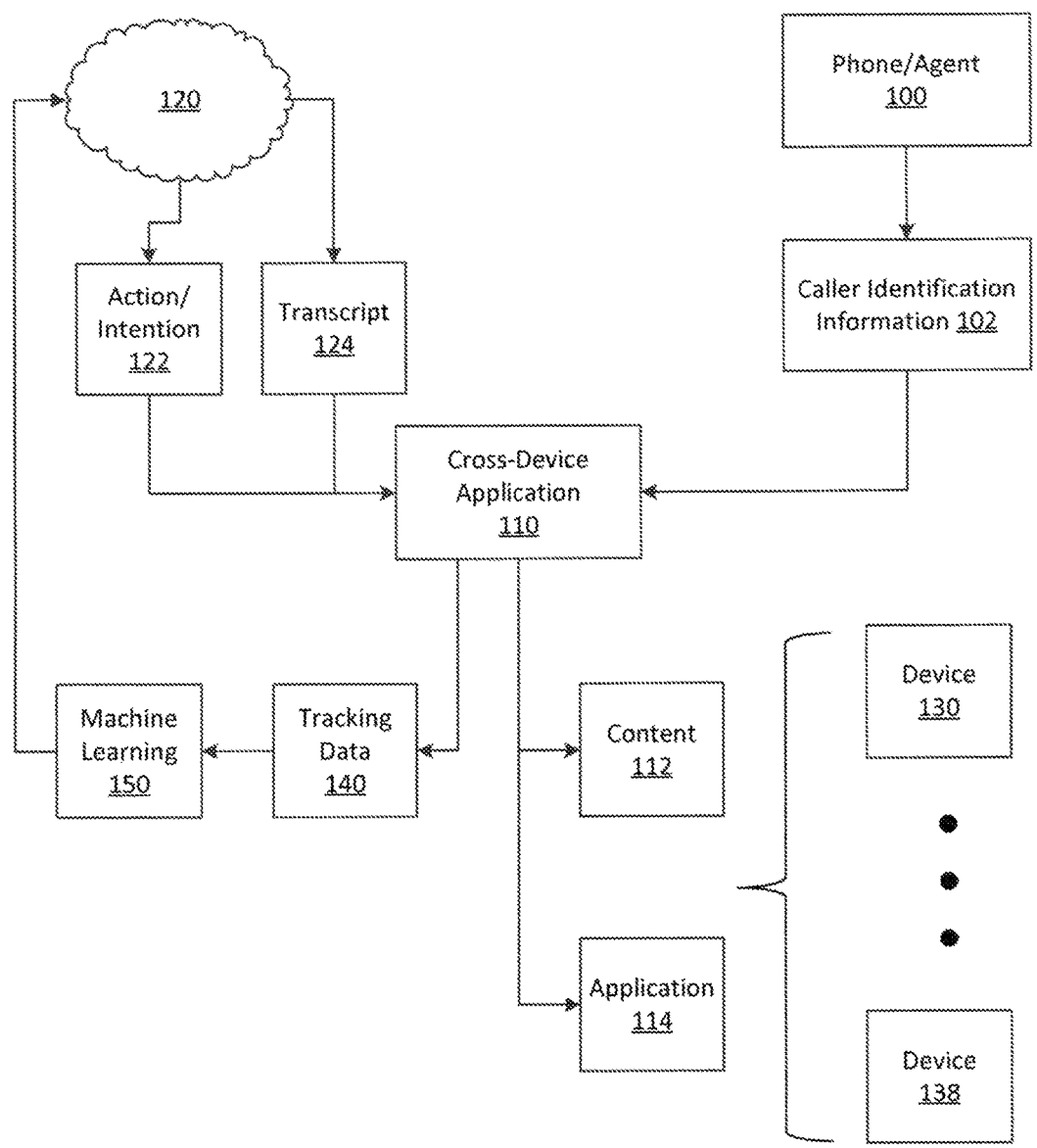
FIG. 2 illustrates another example environment associated with a phone call.

FIG. 2 illustrates another example environment associated with a phone call. In this example, cross-device application 110 also produces tracking data 140 that may be provided to machine learning 150 which will adapt how service 120 produces the action/intention data 122 in the future. The tracking data 140 may identify content that was accessed during the call, applications that were used during the call, or other information. The machine learning 150 may produce data that controls how a natural language processing (NLP) application or circuit available to service 120 will be adapted. In one embodiment, the tracking data may be produced at devices 130-138. In one embodiment, the machine learning 150 may occur at devices 130-138.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
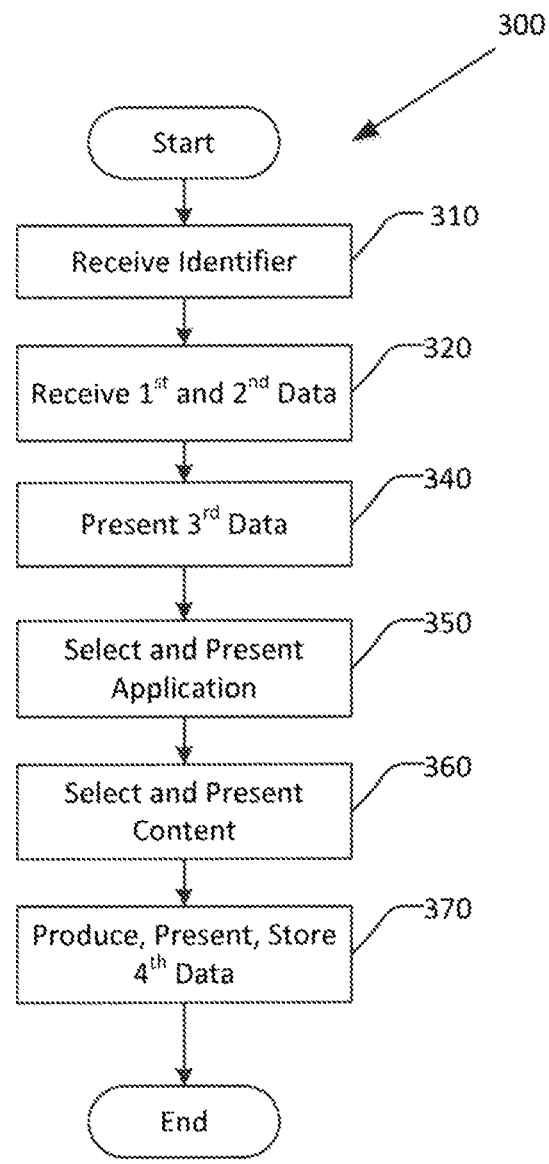
FIG. 3 illustrates an example method associated with phone call context setting by a cross device companion application.

FIG. 3 illustrates an example method 300. Method 300 includes, at 310, receiving an identifier of a caller that initiated the phone call. The identifier may be received from a process (e.g., agent) running on a phone that initiates a phone call. The identifier of the caller may include, for example, a phone number, a device identifier of the phone that initiates the phone call, a location of the phone that initiates the phone call, an email address of the caller, a social media identifier of the caller, or other information. In one embodiment, the identifier may be provided as part of the phone call. In another embodiment, the identifier may be provided using a separate communication channel (e.g., text, email).

Method 300 includes, at 320, receiving first data that describes an intention associated with the phone call. The first data may be received at times including, before a call session or during a call session. The intention may identify whether the phone call is a social communication, a work communication, a travel communication, an informational communication, a family communication, an emergency communication, or a commercial communication. A social communication may be, for example, a call between friends or family that concerns going to a movie, going to a game, or just catching up. A work communication may be, for example, a call between co-workers, a boss and a worker, or other members of an organization that concerns a business matter. A travel communication may concern planning a trip, reporting on a trip, or other similar activity. A family communication may be, for example, a call between family members that concerns the family (e.g., pick up kids, gift list for birthday party, medical instructions for aging parent). An emergency communication may be, for example, a call from a weather bureau that a tornado or tsunami is impending. A commercial communication may be, for example, a notification that an item has been purchased, that an item has been delivered, or other similar commercial activity.

Method 300 also includes, at 320, receiving second data that describes an action associated with the phone call. The second data may be received at times including, before a call session or during a call session. The action may describe whether the phone call concerns a purchase, a payment, an appointment to be made, an appointment to keep, a communication to make, an edit to a document, an edit to a presentation, or other action. A purchase may be, for example, an item to be bought online, an item to be bought at the store, or other item. The purchase may be described by an item, an amount, a time, and other parameters. A payment may be, for example, a rent payment to be made online, a car payment to be made by writing a check, a lunch money payment to be made at school, or other payment. The payment may be described by an item, by an amount, by a time, or by other parameters. An appointment to be made may be, for example, an online meeting to schedule, a physical meeting to schedule, or other type of meeting. The appointment may be described by participants, time, location, and other parameters. An appointment to keep may be, for example, an online meeting to attend, a physical meeting to attend, or other type of meeting to attend. The appointment may be described by participants, time, location, and other parameters. An edit to a document may be, for example, a sentence to add, a word to delete, a comment to make, or other change to the document. The edit may be described by an insertion, a deletion, and a location. An edit to a presentation may be, for example, a graphic to add, text to delete, an animation to include, or other item. The edit may be described by an insertion, a deletion, a change, and a location. The communication to make may be, for example, a phone call, an email, a text, or a social media post. The communication may be described by the desired parties, a desired time, and a desired medium.

Method 300 includes, at 340, presenting third data that describes the caller. The third data may be based, at least in part, on the identifier. Presenting the third data may include displaying the data, making an audible presentation, making a haptic presentation, or other communication of the data. For example, a picture of the caller may be displayed on a computer and the caller's name may be spoken, scrolled in Braille, or presented in other non-visual ways. The third data may describe not just who the caller is but what the caller has been doing that may be relevant to the phone call. For example, the third data may describe a call participated in by the caller. The description may include a start/end time, a transcript of the call, a summary of the call, photographs or documents reference in the phone call, or other information about the call. By way of illustration, if the caller just finished a call with a co-worker and now is calling you, then the transcript of that previous call may be relevant to this call and may help provide context for this call. The third data may describe an email accessed by the caller. By way of illustration, if the caller just sent you an email and now is calling, then that email may be relevant to the call. The third data may include photographs or documents referenced by or attached to the email. The third data may also describe other communications or actions by the caller including, for example, a text accessed by the caller, a social media item (e.g., Facebook® post, Twitter® tweet, Pinterest® pin) accessed by the caller, a search performed by the caller, a document accessed by the caller, or a presentation accessed by the caller. Information about these communications may be provided as part of identifying not just the caller, but what the caller has been doing recently that may be relevant to the phone call. In one embodiment, the third data may come from the cloud, may come from the caller, or may reside in local data already available to the caller.

Method 300 includes, at 350, selecting a computer application that is relevant to the phone call. The computer application may be selected based, at least in part, on the first data and the second data. For example, if the first data indicates that this is a business call and the second data indicates that it's about editing a document, then a word processing application suitable for editing the document may be started and presented on one or more devices available to a recipient of the phone call. The computer application relevant to the phone call may be, for example, an email application, a word processing application, a presentation processing application, a search application, a social media application, a calendar application, a payment application, or other application. Identifying and automatically starting and presenting a relevant application saves time and reduces the overhead associated with context switching.

Method 300 includes, at 360, selecting a piece of electronic content relevant to the phone call. The piece of electronic content may be selected based, at least in part, on the first data and second data. For example, if the first data indicates that this is a business call and the second data indicates that it's about editing a document, then the document to be edited may be accessed and presented on one or more devices available to a recipient of the phone call. The piece of electronic content relevant to the phone call may be, for example, a document, a presentation, an email, a social media post, a calendar entry, an invoice, a receipt, or other information. By way of illustration, if a caller has just looked at an invoice and a check register and now is calling you, and you are a vendor for the caller, then it is likely that the caller is calling about a payment made or to be made on the invoice. Thus, the invoice and a payment record may be selected as content to be displayed. This may save considerable time looking for information during a phone call.

Method 300 includes, at 370, selectively producing fourth data that describes an action to be performed after the phone call is terminated. Once the fourth data is produced, it may be selectively presented and stored. The fourth data may describe, for example, a purchase, a payment, an appointment to be made, an appointment to keep, a communication to make, a document to edit, a presentation to edit, or other item and action. The fourth data may take the form of a to-do list or reminder list. The fourth data may take the form of information that can be provided in a to-do list or reminder list. The fourth data may describe what is to be done (e.g., edit a document), when it is to be done (e.g., before noon tomorrow), by whom it is to be done (e.g., worker name), or other information. Rather than have to hand write a note, the fourth data can be used for electronically reminding someone about a task or even assigning the task to a third party. The fourth data may be directed to a party to the call or to a third party.

The third data, the electronic content, the computer application, or the fourth data may be presented on different devices available to a party to the phone call. The devices may include, for example, a phone of the recipient, a tablet computer of the recipient, a laptop computer of the recipient, a desktop computer of the recipient, a vehicle-based computer of the recipient, or other device. Different devices may be appropriate for different content or different applications at different times. Thus, a member of a set of devices available for presenting the electronic content or computer application may be selected based on factors including a workload on the member, a proximity of the member to the recipient of the phone call, the type of electronic content, the type of computer application, or other factor. By way of illustration, if a worker is running a desktop computer at 90% CPU utilization but has a tablet computer only running at 10% utilization, then the tablet computer may be selected. By way of further illustration, if a person has a laptop that is co-located with the person and a tablet computer that is a mile away, then the laptop may be selected. By way of further illustration, if the content to be presented is a video clip, then a device with a larger or higher resolution screen may be selected over a device with a smaller or lower resolution screen.

Figure 4:
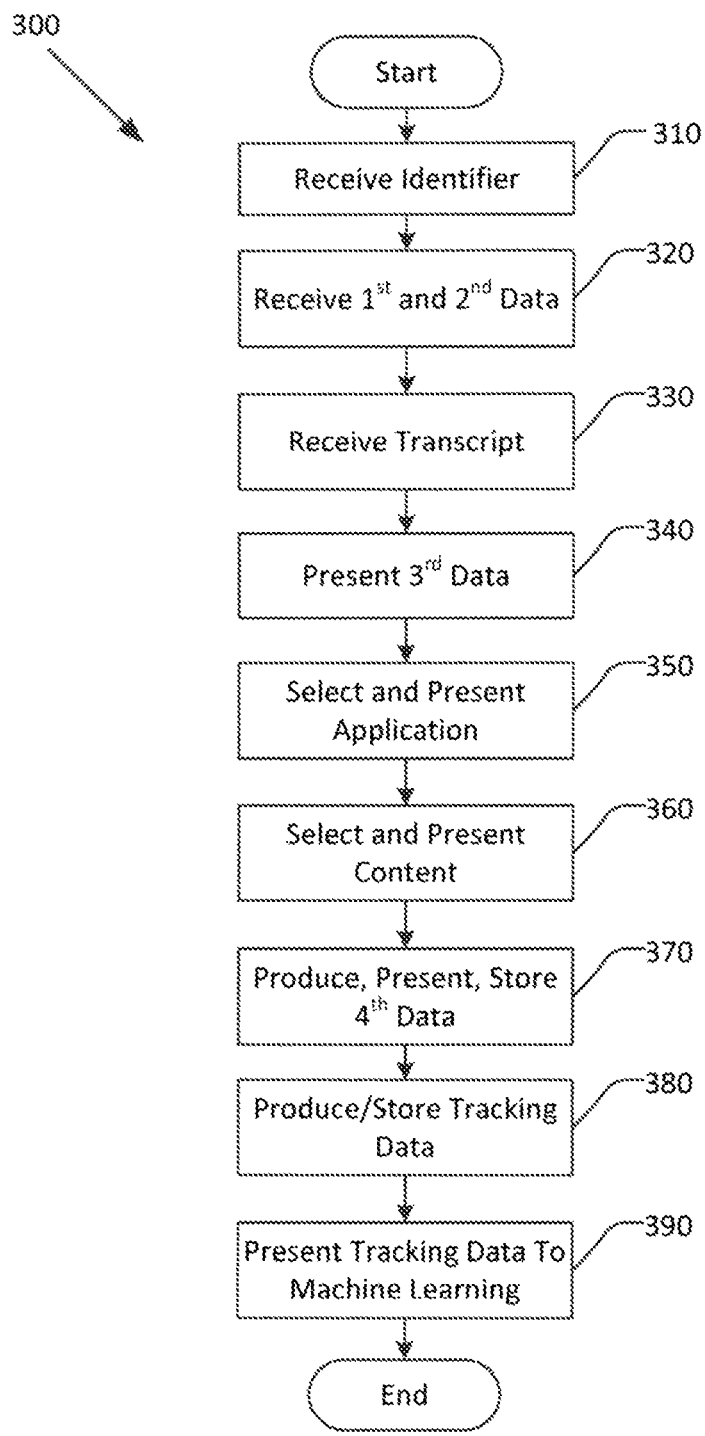
FIG. 4 illustrates an example method associated with phone call context setting by a cross device companion application.

FIG. 4 illustrates another embodiment of method 300. This embodiment also includes, at 330, receiving a text-based transcript of the phone call. The text-based transcript may be produced by a natural language processing (NLP) service. The NLP service may operate in the cloud. In one embodiment, the first data may be selected (e.g., parsed) from the text-based transcript. Similarly, the second data may be selected (e.g., parsed) from the text-based transcript. In one embodiment, the text-based transcript may be provided in real-time (e.g., while the parties are conversing).

Method 300 also includes, at 380, producing and storing tracking data. The tracking data may describe the intention associated with the phone call. For example, the tracking data may describe whether the phone call was a personal, business, or other type of call. The tracking data may describe an action associated with the phone call. For example, the tracking data may describe whether the phone call concerned setting up an appointment, setting up a call, making a purchase, or other action. The tracking data may describe an application used during the phone call by the caller or a recipient of the phone call. For example, if the recipient of the phone call opened up a browser application and searched for a location, then the tracking data may record which browser was used and what searches were performed. The tracking data may describe content referenced during the phone call by the caller or the recipient of the phone call. For example, if the caller looked at a video during the call, then a link to the video or other identifying information about the video may be stored in the tracking data. The tracking data may describe a note taken during the phone call by the caller or the recipient of the phone call. For example, if the recipient used a stylus on their smartphone to make a note, the note may be captured and preserved. In one embodiment, the transcript may be annotated with tracking data that is produced during the phone call. The tracking data may be stored in a data store on the calling phone, in a data store on the phone that was called, on a data store associated with one of the devices available to the caller, in the cloud, or in other data stores.

Method 300 also includes, at 390, presenting the tracking data to a machine learning process. The machine learning process may adapt how the NLP service will select data that describes an intention in the future (e.g., in a subsequent phone call). The machine learning process may also adapt how the NLP service will select data that describes an action for the caller in the future. For example, if the NLP service presented first data that identified the call as a business call, and if the tracking data indicates that business-related documents were edited and that a business-related meeting was scheduled, then the machine learning may enhance or confirm the process that produced the first data. However, if the NLP service presented second data that identified that the action was a meeting to be kept, but the action actually turned out to be a purchase to be made, then the machine learning may diminish or negatively reinforce the process that produced the second data. Various machine learning techniques and approaches may be employed.

While FIGS. 3 and 4 illustrates various actions occurring in serial, it is to be appreciated that various actions illustrated in FIGS. 3 and 4 could occur substantially in parallel. By way of illustration, a first process could receive data, a second process could select content and applications, a third process could present content and applications, a fourth process could produce a to-do list, and a fifth process could produce, store, and provide tacking data. While five processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage device may store computer executable instructions that if executed by a machine (e.g., computer) cause the machine to perform methods described or claimed herein including method 300. While executable instructions associated with the above methods are described as being stored on a computer-readable storage device, it is to be appreciated that executable instructions associated with other example methods described or claimed herein may also be stored on a computer-readable storage device. In different embodiments the example methods described herein may be triggered in different ways. In one embodiment, a method may be triggered manually by a user. In another example, a method may be triggered automatically.

Figure 5:
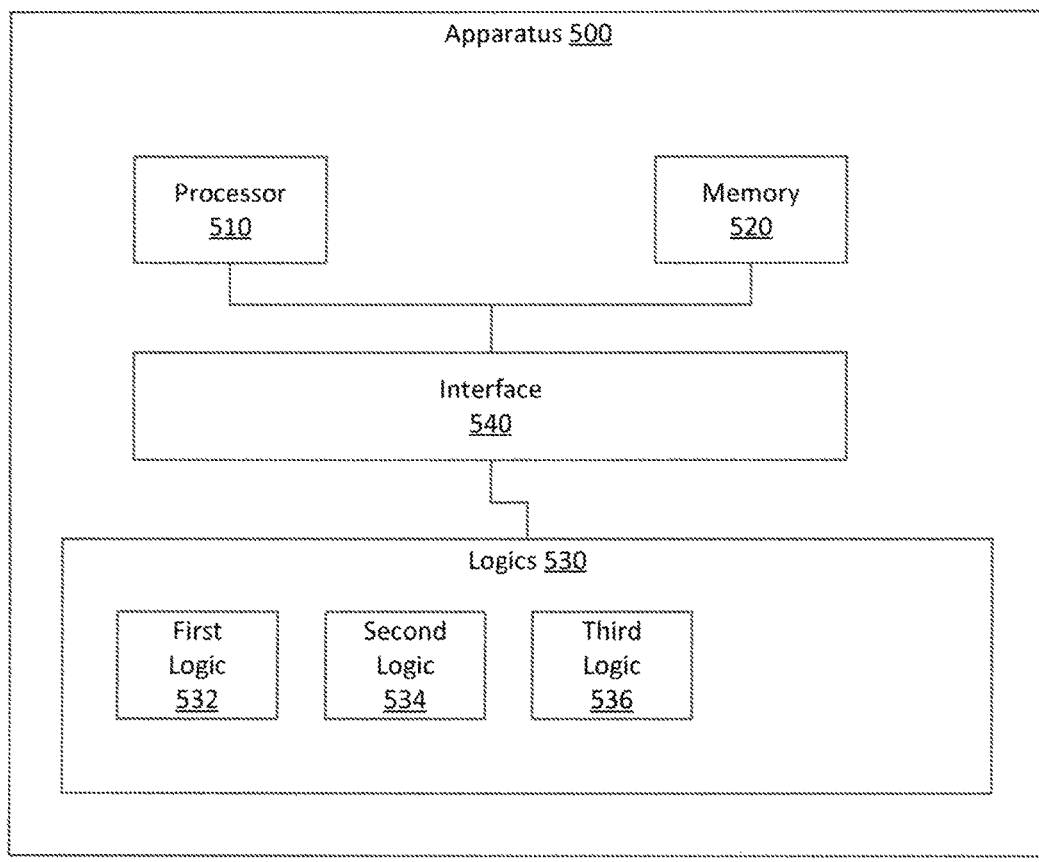
FIG. 5 illustrates an example apparatus associated with phone call context setting by a cross device companion application.

FIG. 5 illustrates an apparatus 500 that includes a processor 510, a memory 520, a set 530 of logics, and an interface 540 that connects the processor 510, the memory 520, and the set 530 of logics. The processor 510 may be, for example, a microprocessor in a computer, a specially designed circuit, a field-programmable gate array (FPGA), an application specific integrated circuit (ASIC), a system-on-a-chip, a dual or quad processor, or other computer hardware. The memory 520 may store data associated with a transaction or instructions to be executed by processor 510. Apparatus 500 may be, for example, a computer, a laptop computer, a tablet computer, a personal electronic device, a smart phone, or other device that can access and process data or calls.

In one embodiment, the apparatus 500 may be a general purpose computer that has been transformed into a special purpose computer through the inclusion of the set 530 of logics. The set 530 of logics may be configured to control one or more computing devices to display to a party of a phone call a relevant content and a relevant application for the phone call during the phone call. For example, the set 530 of logics may be circuits or firmware in a computer that surface relevant content on an appropriate device that is visible to or otherwise available to the party to the phone call. By way of illustration, when the party is receiving a phone call from their boss concerning a presentation on which they are working, then the presentation may be displayed on a device having high resolution graphics capability and visible to the recipient. The presentation may be displayed without the parties having to locate it and share it on an application. By way of further illustration, when the party is receiving a phone call from their friend about tickets to a sporting match, then a search engine may display a schematic of a stadium and lists of tickets available from various ticket brokers. The schematic and ticket sites may be presented without the parties having to manually locate the map or the broker sites. If the party is receiving the call in their car, then the information may be presented on the car computing system. If the party is receiving the call in their living room, then the information may be presented on their television or tablet computer. The parties do not need to select which device will present the content or application.

The set 530 of logics may include a first logic 532 that identifies the party on the phone call. The party may be identified based, at least in part, on data received from a phone used by the party. For example, the party may be identified by a phone number, by an alias, or by other information. In addition to simply identifying the party, the first logic 532 may identify what the party has been doing recently that may be relevant to the phone call. Consider what prompts a person to make a phone call. The person may be looking at something on the internet that reminds them to call their friend. Thus, recent internet (e.g., browsing) activity may be relevant to the call. Similarly, the person may have just finished editing a document at work. Finishing the edits may prompt the user to call a co-worker, boss, or employee. Thus, recent edits may be relevant to the call. In another example, a person may have just received an email that had some important information. The person may pick up the phone in response to the email. Thus, recent emails may be relevant to the call. Other recent activities may also be relevant.

Therefore, in one embodiment, the first logic 532 accesses data that was accessed by the party within a pre-determined time before the phone call or during the phone call. The pre-determined time before the phone call may be measured in clock time (e.g., 1 minute, 5 minutes) or may be measured in activity time (e.g., most recent action, 5 most recent actions). The data accessed by the party may include, for example, email data, text data, word processing data, presentation data, telephonic data, and social media data. The social media data may include, for example, posts made or viewed by the caller, videos made or viewed by the caller, or other social media information.

The set 530 of logics may also include a second logic 534 that identifies the relevant content and the relevant application. The relevant content and relevant application may be identified from text provided in a text-based transcript of the phone call. In one embodiment, the text-based transcript is provided in real time by a natural language processing (NLP) service during the phone call. Thus, during a phone call, a party to the phone call may be presented with a real-time voice-to-text transcript of the call. Interesting information in the transcript may be parsed to discern what content is relevant to the call and what applications are relevant to the call. For example, if the parties are discussing a presentation, then the computer file in which the presentation is stored is likely relevant content and a presentation viewing application is likely a relevant application. But if the parties are discussing a series of posts on a social media site, then the social media application is likely the relevant application and the thread of posts is likely the relevant content.

Different phone calls may have different purposes. Thus, in one embodiment, the second logic 534 selects the relevant content and the relevant application based, at least in part, on what the phone call concerns. The phone call may concern, for example, a family matter, a business matter, a social matter, or other type of matter. The phone call may also concern, for example, a physical meeting, a communication to be made, a transaction to be performed, an update to be made to the relevant content, or other action. By way of illustration, a family matter phone call may concern two family members agreeing to meet at a certain time (e.g., after work) and a certain location (e.g., favorite restaurant) for a certain purpose (e.g., dinner). This information may be used to bring up a website for the restaurant through which a reservation may be made and even through which dinner may be pre-ordered. The menu would be relevant content and the reservation system would be a relevant application. By way of further illustration, a business matter may concern a boss and worker who agree that the boss will complete the review of a document for the worker by a certain time. The document would be the relevant content and a document processing application (e.g., word processor, slide deck processor) would be a relevant application. By way of further illustration, a social matter phone call may concern two friends agreeing to go to a movie and that one of the friends should text their other friend to tell her when and where to meet. The schedule for the theatre may be relevant content and an email or text application to communicate with the third friend may be a relevant application.

The set 530 of logics may also include a third logic 536 that controls one or more devices to selectively present the relevant content and the relevant application. The third logic

536 may identify what devices are available to present the relevant content and the relevant application and may then selectively distribute the relevant content to appropriate devices. A member of the devices may be selected to present the relevant content and to present the relevant application based on factors including a workload on the member, a proximity of the member to the recipient of the phone call, the type of relevant content, the type of the relevant application, or on other factors. By way of illustration, the third logic 536 may determine that a desktop system and a tablet computer are available to display relevant content and relevant applications. However, the third logic 536 may determine that the desktop system is operating above a threshold level (e.g., 90% processor usage) and is running a certain type of application (e.g. compiler) that ought not to be disturbed. The third logic 536 may also determine that the tablet computer is used less than a threshold amount (e.g., 25% processor usage) and is running another application (e.g., video game) that can be disturbed. The third logic 536 may therefore decide to present the relevant content and relevant application on the tablet computer rather than the desktop computer. By way of further illustration, the third logic 536 may determine that a party is in their car and that a smart phone, a laptop computer, and the car's computing system are within one meter of the party. The third logic 536 may determine that the car computing system is appropriate for presenting the relevant content and the relevant application rather than displaying them on the laptop computer.

Figure 6:
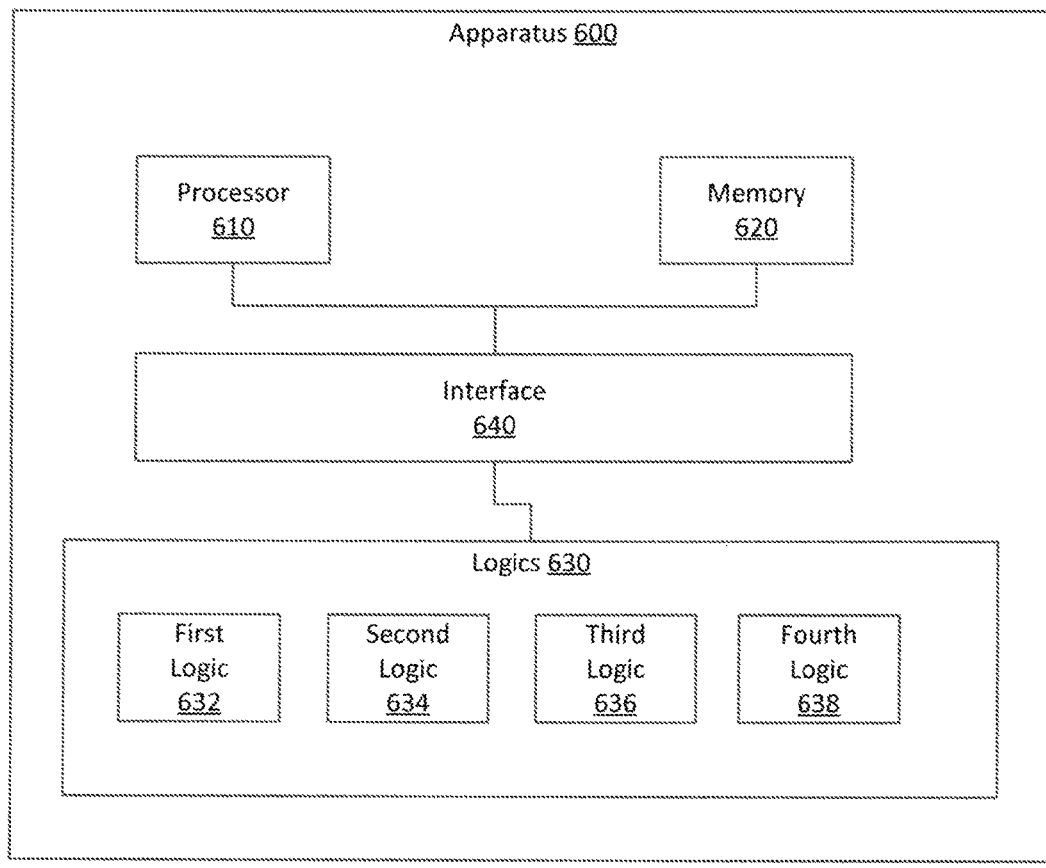
FIG. 6 illustrates an example apparatus associated with phone call context setting by a cross device companion application.

FIG. 6 illustrates an apparatus 600 that is similar to apparatus 500 (FIG. 5). For example, apparatus 600 includes a processor 610, a memory 620, a set of logics 630 (e.g., 632, 634, 636) that correspond to the set of logics 530 (FIG. 5) and an interface 640. However, apparatus 600 includes an additional fourth logic 638. The fourth logic 638 may update an electronic notification system with data that controls the electronic notification system to present an action item to the party on a member of the one or more devices. The action item may concern the physical meeting, the communication to be made, the transaction to be performed, or the update to be made to the relevant content. This data may take the form of a to-do list, a reminder list, or other type of reminder. When the action item is a physical meeting, the to-do list may, for example, include a map annotated with a meeting time and location. When the action item is a communication to be made, the to-do list may, for example, include a link to an application through which the communication can be made and the parties to the communication. Certain fields (e.g., recipient, subject matter) may be pre-populated based on information processed during the phone call. When the action item is a transaction to be performed, the to-do list may include, for example, a link to a commercial application (e.g., shopping site) at which the transaction can be completed. Certain fields (e.g., object to be purchased) may be pre-populated based on information processed during the phone call. When the action item is an update to be made to a document, the to-do list may include a copy of the document. Different action items may produce different to-do list embodiments.

Figure 7:
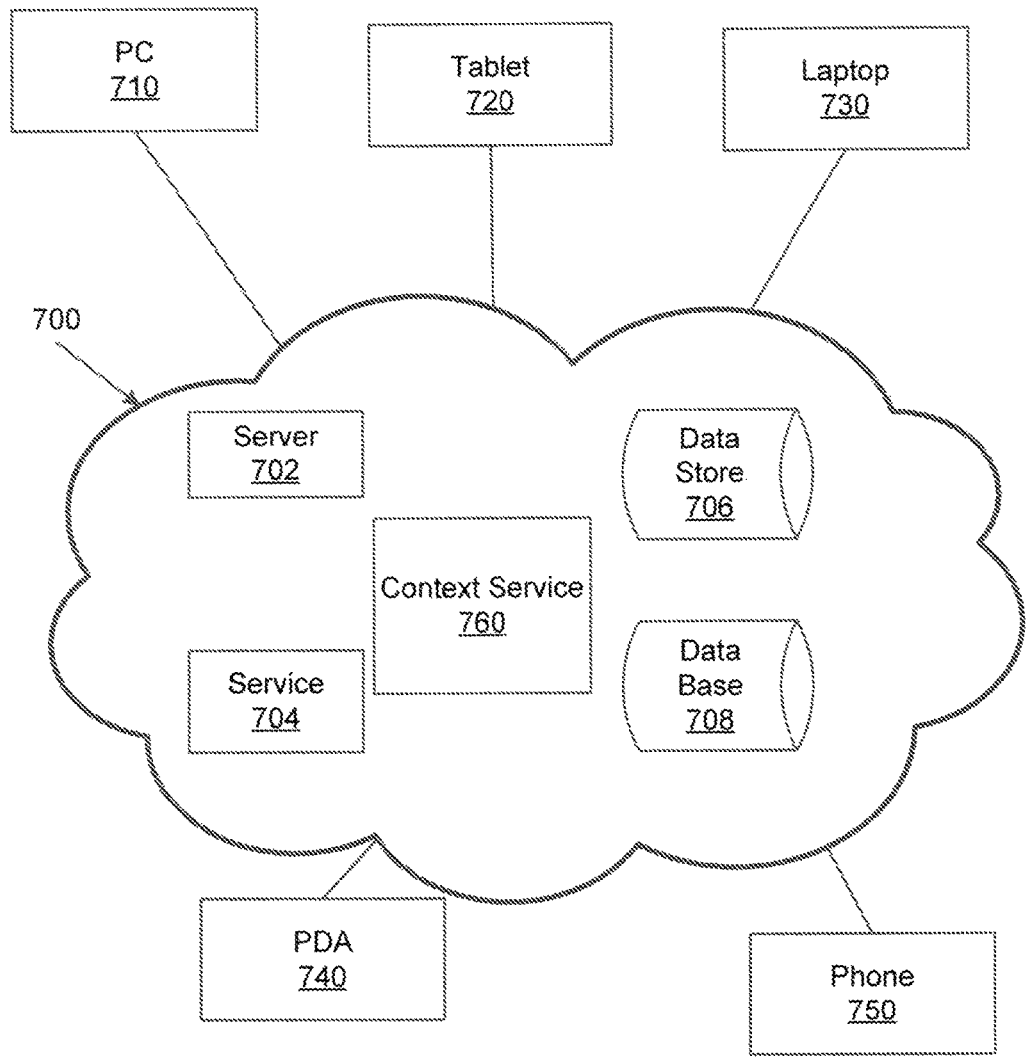
FIG. 7 illustrates an example cloud operating environment associated with phone call context setting by a cross device companion application.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example context service 760 residing in the cloud. The context service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the context service 760.

FIG. 7 illustrates various devices accessing the context service 760 in the cloud. The devices include a computer 710, a tablet 720, a laptop computer 730, a personal digital assistant 740, and a mobile device (e.g., cellular phone, satellite phone) 750. The context service 760 may analyze a call and produce a transcript that is provided to various devices. The context service 760 may also identify action and intention information. In one embodiment, the action and intention information is extracted (e.g., parsed) from the transcript.

It is possible that different users at different locations using different devices may access the context service 760 through different networks or interfaces. In one example, the context service 760 may be accessed by a mobile device 750. In another example, portions of context service 760 may reside on a mobile device 750.

Figure 8:
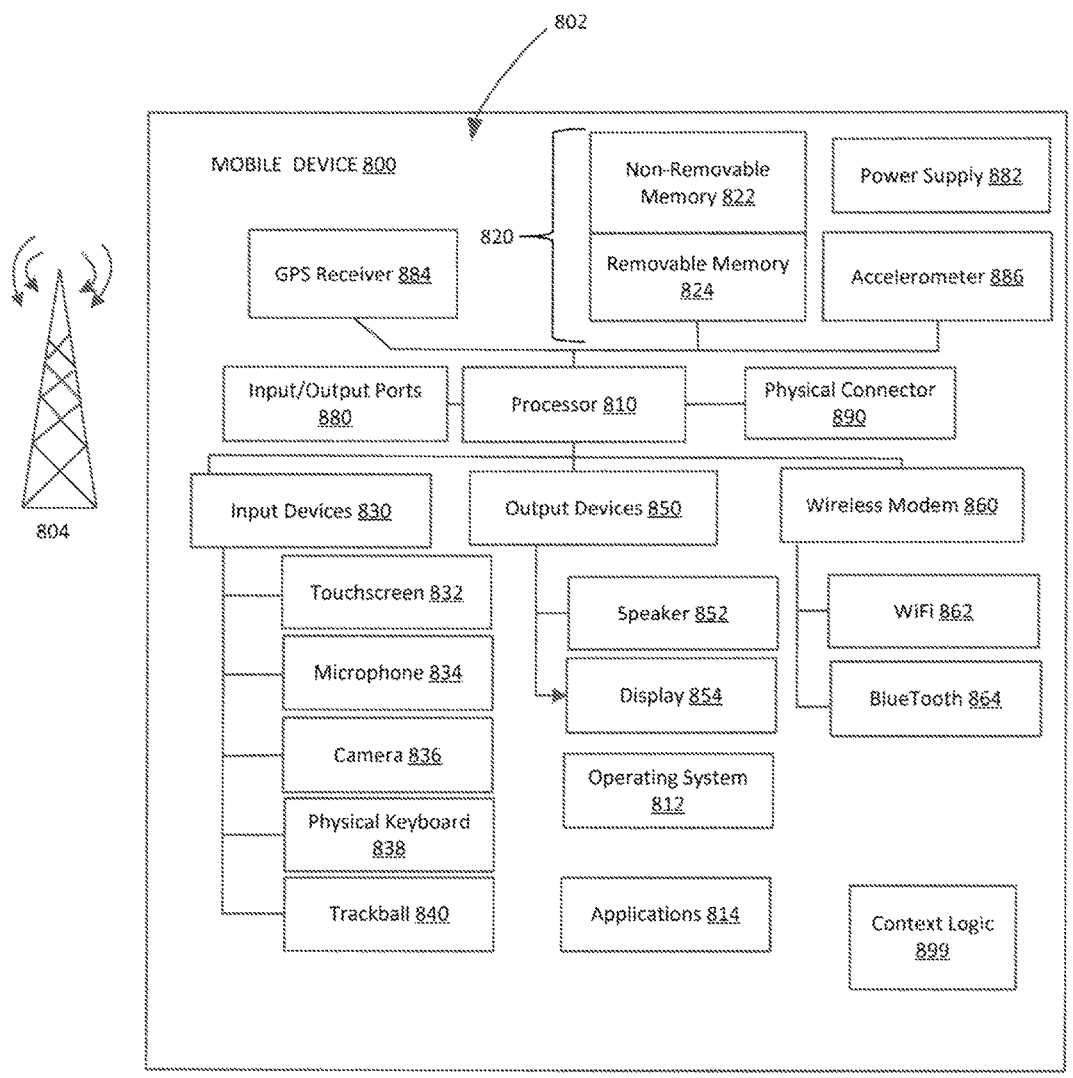
FIG. 8 illustrates an example mobile computing device configured to participate in context setting by a cross device companion application.

FIG. 8 illustrates an example mobile device 800. While FIG. 8 illustrates a mobile device 800, the embodiment is not intended to limit other more general apparatus described in, for example, FIGS. 5 and 6. While a mobile device 800 is illustrated, context setting may also be practiced by devices including computers, tablets, voice over internet protocol devices, and other computing devices.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 can be a variety of computing devices (e.g., cell phone, smartphone, handheld computer, Personal Digital Assistant (PDA), etc.) and can allow wireless two-way communications with one or more mobile communications networks 804, such as a cellular or satellite networks.

Mobile device 800 can include a controller or processor 810 (e.g., signal processor, microprocessor, ASIC, or other control and processing logic circuitry) for performing tasks including signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include RAM, ROM, flash memory, a hard disk, or other memory storage technologies. The removable memory 824 can include flash memory or a Subscriber Identity Module (SIM) card, which is well known in GSM communication systems, or other memory storage technologies, such as "smart cards." The memory 820 can be used for storing data or code for running the operating system 812 and the applications 814. Example data can include web pages, text, images, sound files, video data, or other data sets to be sent to or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830 including, but not limited to, a touchscreen 832, a microphone 834, a camera 836, a physical keyboard 838, or trackball 840. The mobile device 800 may also support output devices 850 including, but not limited to, a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to a gaming application.

A wireless modem 860 can be coupled to an antenna 891. In some examples, RF filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a GSM network for data and voice communications within a single cellular network, between cellular networks, or between the mobile device and a public switched telephone network (PSTN).

The mobile device 800 may include at least one input/output port 880, a power supply 882, a satellite navigation system receiver 884, such as a Global Positioning System (GPS) receiver, an accelerometer 886, or a physical connector 890, which can be a USB port, IEEE 1394 (FireWire) port, RS-232 port, or other port. The illustrated components 802 are not required or all-inclusive, as other components can be deleted or added.

Mobile device 800 may include a context logic 899 that is configured to provide a functionality for the mobile device 800. For example, context logic 899 may provide a client for interacting with a service (e.g., service 760, FIG. 7). Context logic 899 may provide or receive caller identification information. Context logic 899 may provide or receive action and intention information that facilitates establishing a context for a call. Context logic 899 may use the action and intention information to identify content or applications to access and provide on mobile device 800 or on other devices that are available to a party to a call. Context logic 899 may provide a to-do list that is surfaced on device 800 or other devices that are available to a party to a call.

Aspects of Certain Embodiments

In one embodiment, a computerized method includes receiving, from a process running on a phone that initiates a phone call, an identifier of a caller that initiated the phone call. The computerized method includes receiving first data that describes an intention associated with the phone call and receiving second data that describes an action associated with the phone call. The computerized method includes presenting third data that describes the caller, where the third data is based, at least in part, on the identifier. The computerized method includes selecting a computer application that is relevant to the phone call based, at least in part, on the first data and the second data and presenting the computer application on one or more devices available to a recipient of the phone call. The computerized method includes selecting a piece of electronic content relevant to the phone call based, at least in part, on the first data and second data and presenting the electronic content to the recipient using one or more members of the one or more devices. The computerized method includes selectively producing fourth data that describes an action to be performed after the phone call is terminated, selectively presenting the fourth data; and selectively storing the fourth data.

In one embodiment, the computerized method includes producing and storing tracking data that describes the intention associated with the phone call, the action associated with the phone call, an application used during the phone call by the caller or a recipient of the phone call, a content referenced during the phone call by the caller or the recipient of the phone call, a search performed during the phone call by the caller or the recipient of the phone call, or a note taken during the phone call by the caller or the recipient of the phone call.

In one embodiment, the identifier of the caller includes a device identifier of the phone that initiates the phone call, a location of the phone that initiates the phone call, an email address of the caller, or a social media identifier of the caller.

In one embodiment, the first data describes whether the phone call is a social communication, a work communication, a travel communication, an informational communication, a family communication, an emergency communication, or a commercial communication.

In one embodiment, the second data describes whether the phone call concerns a purchase, a payment, an appointment to be made, an appointment to keep, a communication to make, an edit to a document, or an edit to a presentation.

In one embodiment, the communication to make is a phone call, an email, a text, or a social media post.

In one embodiment, the third data describes a call participated in by the caller, an email accessed by the caller, a text accessed by the caller, a social media item accessed by the caller, a search performed by the caller, a document accessed by the caller, or a presentation accessed by the caller.

In one embodiment, the computer application relevant to the phone call is an email application, a word processing application, a presentation processing application, a search application, a social media application, a calendar application, or a payment application.

In one embodiment, the piece of content relevant to the phone call is a document, a presentation, an email, a social media post, a calendar entry, an invoice, or a receipt.

In one embodiment, the fourth data describes a purchase, a payment, an appointment to be made, an appointment to keep, a communication to make, a document to edit, or a presentation to edit.

In one embodiment, the computerized method includes receiving a text-based transcript of the phone call, where the text-based transcript is produced by a natural language processing (NLP) service operating in the cloud, and where the first data is selected from the text-based transcript and where the second data is selected from the text-based transcript.

In one embodiment, the one or more devices include a phone of the recipient, a tablet computer of the recipient, a laptop computer of the recipient, a desktop computer of the recipient, or a vehicle-based computer of the recipient.

In one embodiment, a member of the one or more devices is selected to present the electronic content or to run the computer application based, at least in part, on a workload on the member, on a proximity of the member to the recipient of the phone call, on the type of electronic content, or on the type of computer application.

In one embodiment, the computerized method includes presenting the tracking data to a machine learning process that adapts how a natural language processing (NLP) service will select data that describes an intention and will select data that describes an action for the caller in a subsequent phone call.

In one embodiment, an apparatus includes a processor, a memory, a set of logics configured to control one or more computing devices to display to a party of a phone call a relevant content and a relevant application for the phone call during the phone call, and an interface to connect the processor, the memory, and the set of logics. In one embodiment, the set of logics includes a first logic that identifies the party on the phone call based, at least in part, on data received from a phone used by the party, a second logic that identifies the relevant content and the relevant application based, at least in part, on text provided in a text-based transcript of the phone call, where the text-based transcript is provided in real time by a natural language processing (NLP) service during the phone call, and a third logic that controls the one or more devices to selectively present the relevant content and the relevant application.

In one embodiment, the first logic is configured to access data that was accessed by the party within a pre-determined time before the phone call or during the phone call, where the data accessed by the party includes email data, text data, word processing data, presentation data, telephonic data, and social media data.

In one embodiment, the second logic is configured to select the relevant content and the relevant application based, at least in part, on whether the phone call concerns a family matter, a business matter, or a social matter and on whether the phone call concerns a physical meeting, a communication to be made, a transaction to be performed, or an update to be made to the relevant content.

In one embodiment, the third logic is configured to identify the one or more devices available to present the relevant content and the relevant application, and to selectively distribute the relevant content to the one or more devices, where a member of the one or more devices is selected to present the relevant content and to present the relevant application based, at least in part, on a workload on the member, on a proximity of the member to the recipient of the phone call, on the type of relevant content, or on the type of the relevant application.

In one embodiment, the apparatus includes a fourth logic that updates an electronic notification system with data that controls the electronic notification system to present an action item to the party on a member of the one or more devices, where the action item concerns the physical meeting, the communication to be made, the transaction to be performed, or the update to be made to the relevant content.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage devices may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware or firmware on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing context to a phone call, comprising:
   receiving the phone call;
   selecting a first computer application that is relevant to the phone call based on tracking data associated with one or more previous phone calls and the phone call, wherein the tracking data is based on a speech-to-text transcript of the phone call that is generated by a cloud service during the phone call, and first data and second data that is machine-learned from the tracking data, wherein the first data comprises a type of communication describing the phone call, wherein the second data comprises an action describing a concern of the phone call, and wherein the tracking data comprises a second application used during the previous phone calls; and
   presenting the first computer application on one or more available devices.

2. The method of claim 1, comprising producing and storing the tracking data associated with the previous phone calls, wherein the tracking data associated with the previous phone calls describes at least one previous intention and at least one previous action.

3. The method of claim 2, wherein the tracking data associated with the previous phone calls describes at least one previous application, at least one previous application used during the previous phone calls, at least one content referenced during the previous phone calls, at least one search performed during the previous phone calls, and at least one note taken during the previous phone calls.

4. The method of claim 1, comprising receiving an identifier of a caller that initiates the phone call.

5. The method of claim 4, wherein the identifier of the caller comprises an email address of the caller.

6. The method of claim 4, wherein the identifier comprises a social media identifier of the caller.

7. The method of claim 1, wherein the intention comprises one of a social communication, a work communication, a travel communication, an informational communication, a family communication, an emergency communication, and a commercial communication.

8. The method of claim 1, where the action comprises one of a purchase, a payment, an appointment to be made, an appointment to keep, a communication to make, an edit to a document, and an edit to a presentation.

9. The method of claim 8, where the communication to make comprises a social media post.

10. The method of claim 1, wherein the tracking data comprises a text-based transcript of the phone call.

11. The method of claim 10, wherein the text-based transcript is produced by a natural language processing (NLP) service.

12. The method of claim 1, comprising selecting one or more devices associated with a recipient of the phone call to run the second computer application.

13. The method of claim 12, wherein the one or more devices are selected based on one or more of a workload of the devices, a proximity of the devices to the recipient of the phone call, and the second computer application.

14. The method of claim 1, where the one or more devices include a phone of the recipient, a tablet computer of the recipient, a laptop computer of the recipient, a desktop computer of the recipient, or a vehicle-based computer of the recipient.

15. A computer-readable storage device storing computer-executable instructions that when executed by a computer processor, cause the computer processor to:
   receive a phone call;
   select a first computer application that is relevant to the phone call based on tracking data associated with one or more previous phone calls and the phone call, wherein the tracking data is based on a speech-to-text transcript of the phone call that is generated by a cloud service during the phone call, and first data and second data that is machine-learned from the tracking data, wherein the first data comprises a type of communication describing the phone call, wherein the second data comprises an action describing a concern of the phone call, and wherein the tracking data comprises a second application used during the previous phone calls; and
   present the first computer application on one or more available devices.

16. The computer-readable storage device of claim 15, wherein the computer-executable instructions cause the computer processor to receive an identifier of a caller that initiates the phone call, wherein the identifier of the caller comprises a social media identifier of the caller.

17. The computer-readable storage device of claim 15, wherein the action comprises a communication to make, where the communication to make comprises a text message.

18. The computer-readable storage device of claim 15, wherein the tracking data comprises a text-based transcript of the phone call, and wherein the text-based transcript is produced by a natural language processing (NLP) service.

19. An apparatus, comprising:
   a processing unit;
   a memory comprising computer-executable code that, when executed by the processing unit, cause the processing unit to:
   receive a phone call;
   select a first computer application that is relevant to the phone call based on tracking data associated with one or more previous phone calls and the phone call, wherein the tracking data is based on a speech-to-text transcript of the phone call that is generated by a cloud service during the phone call, and first data and second data machine-learned from the tracking data, wherein the first data comprises a type of communication describing the phone call, wherein the second data comprises an action describing a concern of the phone call, and wherein the tracking data comprises a second application used during the previous phone calls; and present the first computer application on one or more available devices.

20. The apparatus of claim 19, wherein the computer-executable code cause the processing unit to receive an identifier of a caller that initiates the phone call, wherein the identifier of the caller comprises an email address of the caller.

* * * * *